United States Patent
Asai et al.

(10) Patent No.: US 9,196,897 B2
(45) Date of Patent: Nov. 24, 2015

(54) SECONDARY BATTERY POROUS ELECTRODE

(75) Inventors: Takahiro Asai, Kanagawa (JP); Takashi Ono, Kanagawa (JP); Kiyoshi Kanamura, Tokyo (JP); Hirokazu Munakata, Tokyo (JP)

(73) Assignees: TOKYO OHKA KOGYO CO., LTD., Kawasaki-Shi (JP); TOKYO METROPOLITAN UNIVERSITY, Tokyo (JP)

( * ) Notice: Subject to any disclaimer, the term of this patent is extended or adjusted under 35 U.S.C. 154(b) by 178 days.

(21) Appl. No.: 13/811,347

(22) PCT Filed: Jun. 22, 2011

(86) PCT No.: PCT/JP2011/064236
§ 371 (c)(1),
(2), (4) Date: Apr. 24, 2013

(87) PCT Pub. No.: WO2012/011351
PCT Pub. Date: Jan. 26, 2012

(65) Prior Publication Data
US 2013/0209872 A1      Aug. 15, 2013

(30) Foreign Application Priority Data

Jul. 23, 2010 (JP) ................................. 2010-165628
Feb. 14, 2011 (JP) ................................. 2011-028752

(51) Int. Cl.
| | | |
|---|---|---|
| *H01M 4/13* | (2010.01) | |
| *H01M 4/58* | (2010.01) | |
| *H01M 4/139* | (2010.01) | |
| H01M 8/10 | (2006.01) | |
| H01M 8/02 | (2006.01) | |
| H01M 4/86 | (2006.01) | |
| H01M 4/525 | (2010.01) | |
| H01M 4/04 | (2006.01) | |
| H01M 4/1395 | (2010.01) | |
| H01M 10/052 | (2010.01) | |
| C25D 3/60 | (2006.01) | |

(52) U.S. Cl.
CPC ................ *H01M 4/13* (2013.01); *H01M 4/139* (2013.01); *H01M 4/581* (2013.01); *C25D 3/60* (2013.01); *H01M 4/0452* (2013.01); *H01M 4/1395* (2013.01); *H01M 4/525* (2013.01); *H01M 4/8605* (2013.01); *H01M 4/8626* (2013.01); *H01M 8/023* (2013.01); *H01M 8/0247* (2013.01); *H01M 8/1062* (2013.01); *H01M 10/052* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 7,432,016 B2 | 10/2008 | Sugiyama et al. | |
| 2005/0058906 A1 | 3/2005 | Sugiyama et al. | |
| 2010/0167111 A1* | 7/2010 | Sumihara et al. | 429/94 |
| 2011/0134585 A1* | 6/2011 | Shen et al. | 361/502 |

FOREIGN PATENT DOCUMENTS

| | | | |
|---|---|---|---|
| CN | 1599098 A | 3/2005 | |
| JP | 2005-116519 A | 4/2005 | |
| JP | 2006-260886 A | 9/2006 | |
| JP | 2008-258137 A | 10/2008 | |
| JP | 2009-164137 | 7/2009 | |
| WO | WO 2008059936 | * 5/2008 | |

OTHER PUBLICATIONS

Woo et al., Preparation and Electrochemical Properties of Porous Sn-Ni Alloy with Ordered Domain Structure as an Anode for Rechargeable Lithium Ion Batteries, Proceedings of the 50th Battery Symposium in Japan 3A01 (2009), The committee of Battery Technology.
Notice of Reasons for Rejection in Chinese Patent Application No. 201180045450.7 5, mailed Sep. 28, 2014.

* cited by examiner

*Primary Examiner* — Ladan Mohaddes
(74) *Attorney, Agent, or Firm* — Knobbe, Martens, Olson & Bear, LLP

(57) ABSTRACT

An electrode having excellent charge/discharge cycle characteristics and which is capable of improving a secondary battery capacity. An electrode is formed on the surface of a collector as an assembly of multiple porous domain structures that are apart from each other, the porous domain structures each having a polygonal shape without an acute angle in a planar view, the polygonal shape having a maximum diameter of 120 μm or less.

6 Claims, 6 Drawing Sheets

SECONDARY BATTERY POROUS ELECTRODE

This application is the U.S. National Phase under 35 U.S.C. §371 of International Application PCT/JP2011/064236, filed Jun. 22, 2011, designating the U.S., and published in Japanese as WO 2012/011351 on Jan. 26, 2012, which claims priority to Japanese Patent Application No. 2010-165628, filed Jul. 23, 2010; and to Japanese Patent Application No. 2011-028752, filed Feb. 14, 2011, the entire contents of which are incorporated herein by reference.

TECHNICAL FIELD

The present invention relates to an electrode preferably used as one for a secondary battery.

BACKGROUND ART

In recent years, mobile devices such as mobile phones, laptop computers or camcorders have formed a large market. As a power source for use in such a mobile device, there has been a strong demand for a lightweight, small-sized secondary battery having a high energy density. In particular, a lithium-ion secondary battery has superiority in these required characteristics as compared with other secondary batteries, and its adoption to the mobile device is in progress. In the lithium-ion secondary battery during discharge, lithium existing in a negative electrode is oxidized into lithium ions and released, whereas lithium ions are reduced into a lithium compound and stored into a positive electrode. Further, during charge, the lithium ions are reduced into lithium and stored into the negative electrode, whereas the lithium compound existing in the positive electrode is oxidized into lithium ions and released. As thus described, in the lithium-ion secondary battery, lithium ions move between the positive electrode and the negative electrode, and stored as lithium or a lithium compound into either electrode.

As a negative-electrode material for such a secondary battery, a carbon material such as graphite is used. For example, when graphite is used as the negative-electrode material, lithium is stored between graphite layers, thereby generating charge/discharge. However, graphite has a drawback of being unable to obtain a charge/discharge capacity of 372 mAh/g or larger by calculation from $LiC_6$ as the maximum lithium-introduced compound since intercalation of lithium ions into a graphite crystal is a principle of charge/discharge of graphite.

Meanwhile, there has also been conducted an extensive research on using a metal material, which is alloyed with lithium, for the negative electrode. It has then been reported that in one using such a metal material for the negative electrode, there can be obtained a capacity larger than 372 mAh/g which is the charge/discharge capacity of graphite. However, in the negative electrode using these materials, large volume expansion occurs at the time of forming an alloy with lithium, to generate stress on its inside, and hence the alloy is pulverized by repetition of charge/discharge, causing a problem of not being able to obtain excellent charge/discharge cycle characteristics (i.e., electrode life).

For this reason, Patent Document 1 proposes a negative electrode for a lithium secondary battery which is made of a metal capable of being alloyed with lithium and has a porous structure. Using such a negative electrode can alleviate internal stress associated with a volume change at the time of the negative-electrode material forming an alloy with lithium, so as to seek improvement in charge/discharge cycle characteristics. Further, Non-patent Document 1 proposes that the porous electrode described in Patent Document 1 is divided and formed into a plurality of columnar structures apart from each other on the surface of a collector. Using such a negative electrode can further alleviate internal stress of the negative electrode in charge/discharge, so as to further seek improvement in charge/discharge cycle characteristics.

Patent Document 1: Japanese Unexamined Patent Application, Publication No. 2006-260886

Non-patent Document 1: Woo, Okada, Munekata, Kanemura, "Production and characteristic evaluation of porous Sn—Ni alloy negative electrode having domain structure for lithium-ion secondary battery", Proceedings of the 50th Battery Symposium in Japan 3A01 (2009), THE COMMITTEE OF BATTERY TECHNOLOGY

DISCLOSURE OF THE INVENTION

Problems to be Solved by the Invention

Applying the porous negative electrode described in Patent Document 1 to a lithium-ion secondary battery leads to improvement in life as compared with the case of previous alloy-type negative electrodes. However, even such a porous negative electrode has had room for improvement in that an influence exerted by internal stress in the negative electrode still exists and occurrence of clacking in the negative electrode associated with repetition of charge/discharge is recognized. In this respect, using the negative electrode described in Non-patent Document 1 significantly suppresses the occurrence of cracking in the negative electrode as well as significantly improving the life. However, since the negative electrode described in Non-patent Document 1 is formed as an assembly of columnar structures apart from each other on the surface of the collector, there are many unused places not formed with the negative electrode out of the surface of the collector, and the negative electrode thus has room for improvement in battery capacity.

The present invention was made in view of such circumstances, and has an object to provide an electrode having excellent charge/discharge cycle characteristics and capable of improving a secondary battery capacity.

Means for Solving the Problems

As a result of conducting extensive studies for solving the above problems, the present inventors found it possible to improve both charge/discharge cycle characteristics and a battery capacity by forming an electrode on the surface of a collector as an assembly of a plurality of porous domain structures apart from each other, making this porous domain structure have a polygonal shape without an acute angle and making the shape have a maximum diameter of 120 μm or less, and thus reached completion of the present invention.

The present invention is an electrode formed on the surface of a collector as an assembly of a plurality of porous domain structures apart from each other, the porous domain structures each having a polygonal shape without an acute angle in a planar view, the polygonal shape having a maximum diameter of 120 μm or less.

Effects of the Invention

According to the present invention, there is provided an electrode having excellent charge/discharge cycle characteristics and capable of improving a secondary battery capacity.

Figure 1:
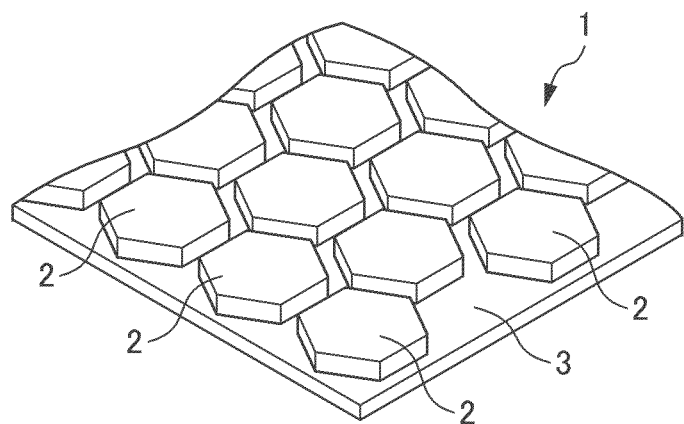
FIG. 1 is a perspective view showing a first embodiment of an electrode of the present invention.

EXPLANATION OF REFERENCE NUMERALS 1 electrode
2 domain structure (porous domain structure)
3 collector

PREFERRED MODE FOR CARRYING OUT THE INVENTION

Figure 2:
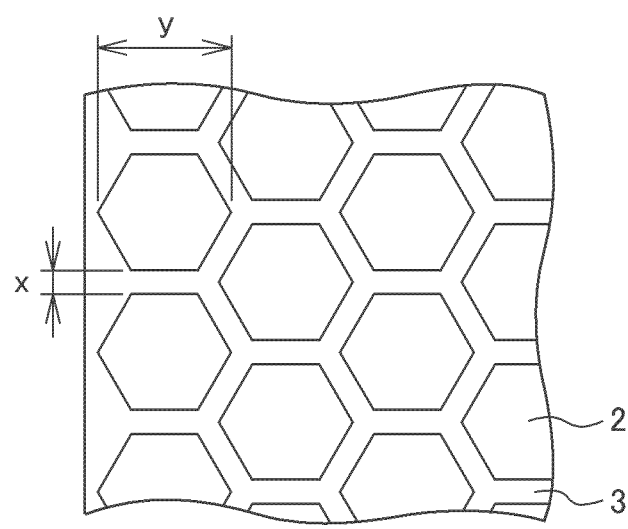
FIG. 2 is a plan view showing the first embodiment of the electrode of the present invention.
Figure 3:
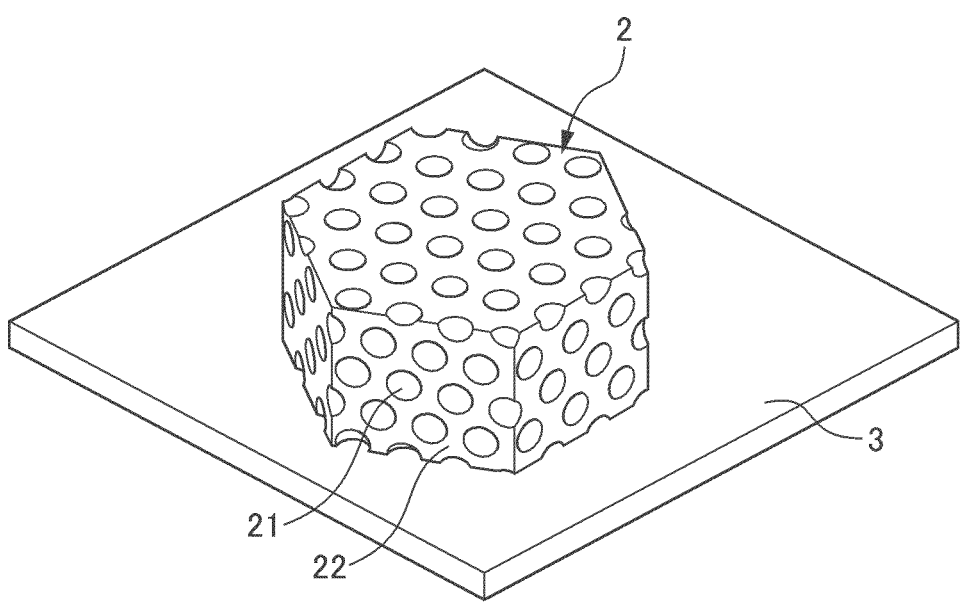
FIG. 3 is an expanded perspective view showing a domain structure in the first embodiment of the electrode of the present invention.

Hereinafter, a first embodiment of the present invention will be described with reference to the drawings. FIG. 1 is a perspective view showing a first embodiment of an electrode of the present invention. FIG. 2 is a plan view showing the first embodiment of the electrode of the present invention. FIG. 3 is an expanded perspective view showing a domain structure in the first embodiment of the electrode of the present invention.

As shown in FIGS. 1 and 2, an electrode 1 is formed on the surface of a collector 3 as an assembly of a plurality of porous domain structures 2 apart from each other. In each one of these domain structures 2, a positive-electrode reaction or a negative-electrode reaction is generated, and a current generated by each of those reactions is collected to the collector 3.

Batteries using the electrode 1 of the present invention include a chargeable/dischargeable secondary battery. Such secondary batteries include, but are not particularly limited to, a lithium-ion secondary battery. Although an electrode of a lithium-ion secondary battery will be described below as an embodiment of the present invention, the present invention is not limited to this, but is preferably applied to a secondary battery in which a release of ions from the electrode or storage of ions into the electrode occurs associated with charge/discharge.

The electrode 1 for a lithium-ion secondary battery of the present embodiment may be a negative electrode or a positive electrode. When the electrode 1 of the present embodiment is the negative electrode, the electrode 1 is made up of a metal which is alloyed with lithium, or an alloy. Such a metal and alloy are exemplified by tin, lead, silver an alloy containing these metals, and the like. Among these, tin or a tin alloy such as Si—Ni is practical in light of material cost. In the case of using the tin alloy as the negative electrode, there may be used one with a content of tin being in the range of 5 to 99.995% by mass in the negative electrode.

When the electrode 1 of the present embodiment is the positive electrode, as the electrode 1, a metal chalcogen compound or the like which can store and release lithium ions during charge/discharge can be preferably used. Such metal chalcogen compounds include oxides of vanadium, sulfides of vanadium, oxides of molybdenum, sulfides of molybdenum, oxides of manganese, oxides of chromium, oxides of titanium, sulfides of titanium, and composite oxides and composite sulfides of these. Preferred are $Cr_3O_8$, $V_2O_5$m $V_5O_{18}$, $VO_2$, $Cr_2O_5$, $MnO_2$, $TiO_2$, $MoV_2O_8$, $TiS_2V_2S_5MoS_2$, $MoS_3VS_2$, $Cr_{0.25}V_{0.75}S_2$, $CR_{0.5}V_{0.5}S_2$, and the like. Also preferably used are oxides such as $LiMY_2$ (M is a transition metal such as Co or Ni, and Y is a chalcogen atom such as O or S), $LiM_2Y_4$ (M is Mn, and Y is O), and $WO_3$, sulfides such as CuS, $Fe_{0.25}V_{0.55}S_2$ and $Na_{0.1}CrS_2$, phosphorus-sulfur compounds such as $NiPS_8$ and $FePS_8$, selenium compounds such as $VSe_2$ and $NbSe_3$, and the like.

The electrode 1 is formed on the surface of the collector 3. As the collector 3, any known one can be used so long as being a material having electrical conductivity. These materials include copper, nickel and stainless, but copper is preferably used. In addition, although the collector 3 is not particularly limited, when a metal which is alloyed with the electrode 1 by a treatment such as heating is used as the collector 3, an alloy layer (not shown) of a metal constituting the domain structures 2, which constitutes the electrode 1, and a metal constituting the collector 3 can be formed in the vicinity of a boundary between the domain structures 2 and the collector 3. The formation of such an alloy layer is preferred since it leads to improvement in adherence between the domain structures 2 and the collector 3, to allow suppression of detachment of the domain structure 2 from the collector 3 due to swelling or shrinkage of the domain structure 2 during charge/discharge. As the collector 3, one in a plate shape or a foil shape is practical.

It is to be noted that in the present embodiment, a polarity of each of the domain structures 2 provided on the surface of collector 3 is identical. Hence the assembly of the domain structures 2 can be treated as one electrode. That is, the electrode 1 as the assembly of the domain structures 2 is either the positive electrode or the negative electrode. When the electrode 1 is the negative electrode, the positive electrode, not shown, is provided via a separator or the like, to form a battery. Further, when the electrode 2 is the positive electrode, the negative electrode, not shown, is provided via the separator or the like, to form a battery.

The domain structure 2 constituting the electrode 1 is formed as having a polygonal shape without an acute angle in a planar view from above the collector 3. Although described later, the domain structure 2 of the present embodiment is formed by using as a mold a resist film having a through hole which passes through to the surface of the collector 3 and has the same shape as the domain structure 2 in a planar view, and filling the through hole with a metal that constitutes the domain structure 2. In this case, when a place being an acute angle is included in the through hole to serve as the mold, stress generated in the mold at the time of filling the through hole with the metal is concentrated on the place of the acute angle to cause occurrence of cracking in the mold, which may make it impossible to form the domain structure 2 into an intended shape. From such a viewpoint, in the present invention, the domain structure 2 is formed to have a polygonal shape without an acute angle in a planar view from above the collector 3.

The shapes of the domain structure 2 include a polygonal prism shape having a polygonal-shaped cross section without an acute angle, such as a quadrangular prism, a pentagonal prism, a hexagonal prism, a heptagonal prism and an octagonal prism. Among these, the polygonal prism shape as a rectangle, a square or a regular hexagon in a planar view from above the collector 3 is preferred, and a reason for this will be described later. It is to be noted that in order to facilitate understanding of the present invention, the electrode 1 will be described in the present embodiment where the domain structure 2 is a regular hexagon in a plan view from above the collector 3, and a spacing width between each domain structure 2 is the same. In this case, the electrode 1 is made up of a plurality of domain structures 2 arranged in a honeycomb shape in a plan view from above the collector 3. Heights of the domain structure 2 may be decided as appropriate in accordance with a size, a charge/discharge capacity and the like which are required of the electrode 1, but include 18 to 50 µm as one example.

In the electrode 1 of the present embodiment, the plurality of domain structures 2 constituting the electrode 1 are arranged being apart from each other as shown in FIG. 1, and are each formed as a porous body as shown in FIG. 3. This is one of the points of the present invention.

Conventionally, when an electrode is formed of a metal material such as an alloy in a secondary battery accompanied with a release of ions from the electrode or storage of ions into the electrode, such as a lithium-ion secondary battery, the electrode generates large internal stress due to a volume change associated with alloying or dealloying during charge/discharge, and is then pulverized by this internal stress, causing a decrease in subsequent charge/discharge capacity. The present inventors found that such internal stress associated with a volume change was generated in connection with formation of the conventional electrode in the secondary battery as a massive structure without a clearance such as a foil shape or a plate shape, and discovered that forming the electrode 1 as an assembly of a plurality of porous domain structures 2 apart from each other could solve these problems.

For this reason, the domain structure 2 of the present embodiment is formed as a porous body having a plurality of holes 21 as shown in FIG. 3. In the present embodiment, these holes are each provided as having a substantially spherical shape, and these substantially spherical holes are provided so as to be close-packed, but the present invention is not limited to this. By the domain structure 2 of the present embodiment being such a porous body, even when a volume change occurs in a metal material 22 constituting the domain structures 2 associated with charge/discharge, the hole 21 included inside the domain structure 2 absorbs the volume change of the metal material 22, to alleviate generation of internal stress. That is, when the metal material 22 constituting the domain structure 2 swells due to charge, the hole 21 included in the domain structure 2 provides a space for the metal material 22 to swell so as to fill in the hole 21, which alleviates generation of internal stress. On the contrary, when the metal material 22 constituting the domain structure 2 shrinks due to discharge, the metal material 22 having swollen so as to fill in the hole 21 included in the domain structure 2 shrinks, and the hole 21 is restored to almost its original size. As thus described, the hole 21 included in the domain structure 2 exhibits a buffering function at the time of swelling or shrinkage of the metal material 22, to alleviate internal stress generated inside the domain structures 2. A hole diameter of the hole 21 is exemplified by, but not particularly limited to, the order of 0.05 to 5 µm.

A proportion of a volume of the holes 21 in a volume of the domain structure 2, namely a porosity, may be decided as appropriate in consideration of mechanical strength of the domain structure 2 and a required degree of an internal stress alleviating effect. The porosity is preferably exemplified by 10 to 98%, and more preferably exemplified by 50 to 80%.

As for the domain structure 2, as shown in FIG. 1, the plurality of domain structures 2 are arranged so as to be apart from each other. As described above, the domain structure 2 has the holes 21 on its inside, thereby to alleviate stress generated on the inside. However, when the domain structures 2 are each provided while being coupled with each other, namely when the electrode is provided as a porous body in the shape of one plate without having a domain structure, internal stress that is generated in a height direction and in a vertical direction (hereinafter referred to as a transverse direction in this section) of the electrode might not be sufficiently absorbed. In this case, cracking might occur in the electrode or peeling between the electrode and the collector might occur due to the stress in the transverse direction. For this reason, the domain structures 2 of the present embodiment are arranged such that the plurality of domain structures 2 are apart from each other. It is thereby possible to alleviate the stress in the transverse direction of the domain structure 2 during charge/discharge, so as to suppress occurrence of the above problem.

As described above, the domain structure 2 has a polygonal shape without an acute angle in a planar view from above the collector, and is formed such that the polygonal shape has a maximum diameter of 120 µm or less. That is, the domain structure 2 is formed such that its maximum diameter when planarly viewed is 120 µm or less. In their research on the electrode shape, the present inventors manufactured a porous electrode formed as a unit and having no domain structure, and considered how cracking occurred during its charge/discharge. As a result, the present inventors found that repetition of charge/discharge leads to division of the one-unit porous electrode into a size of the order of 50 to 60 µm due to cracking, and discovered that occurrence of cracking in the electrode can be suppressed when the maximum diameter of the electrode in a planar view is 120 µm or less. Based on this discovery, in the present invention, the electrode is formed by being divided into a plurality of domain structures 2, and the maximum diameter of this domain structure 2 when planarly viewed is set to 120 µm or less. The maximum diameter of the domain structure 2 when planarly viewed is preferably 100 µm or less, and further preferably 50 µm or less. It should be noted that "the maximum diameter of the domain structure 2 when planarly viewed" means the maximum dividing line among dividing lines that pass through the center of a polygonal shape and divide the polygonal shape into two pieces, the polygonal shape being observed when the domain structure 2 is planarly viewed. Lengths of such a dividing line include a length y shown in FIG. 2. Further, a spacing width x between each domain structure 2 is preferably from 10 to 100 µm, more preferably from 10 to 50 µm, and further preferably from 10 to 20 µm. In addition, although every spacing width between each domain structure 2 is preferably the same for a later-described reason, every space is not necessarily required to be the same.

Next, the shape of the domain structure 2 will be described. As described above, in the electrode 1 of the present embodiment, the porous domain structures 2 are each arranged being apart from each other on the surface of the collector 3. At this time, from the viewpoint of forming the electrode with a sufficient area on the surface of the collector 3 and maximizing the secondary battery capacity, the electrode may be produced covering the surface of the collector by the domain structures without a clearance. However, when the electrode is placed covering the surface of the collector without a clearance, cracking might occur in the electrode or peeling might occur between the electrode and the collector as described above. In order to ensure a sufficient charge/discharge capacity while suppressing occurrence of such a problem, it is of necessity to make each of the domain structures 2 apart from each other to minimize an area of a place not provided with the electrode on the surface of the collector 3.

From the viewpoint as thus described, the planar-view shape of the domain structure 2 is preferably a rectangle, a square or a regular hexagon. This will be described with reference to FIG. 4. FIGS. 4(A) to 4(D) are views explaining arrangement states of respective domain structures in the case of producing the domain structures having a variety of planar-view shapes.

Figure 4A:
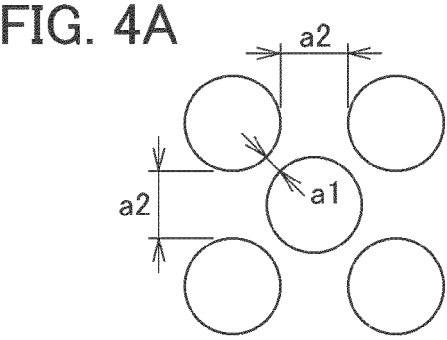
FIGS. 4(A) to 4(D) are views explaining arrangement states of respective domain structures in the case of producing the domain structures having a variety of planar-view shapes.
Figure 4B:
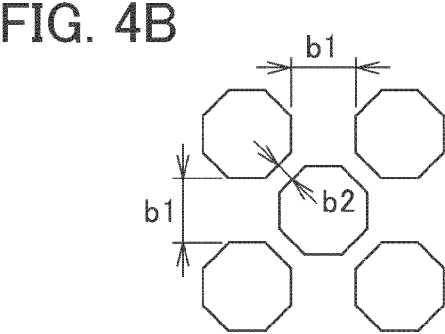
Figure 4C:
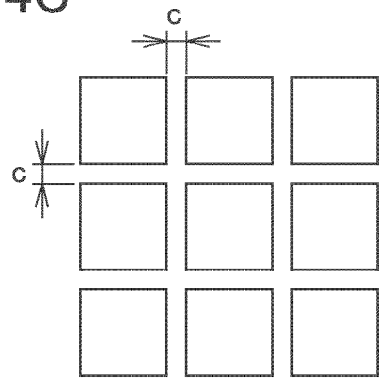
Figure 4D:
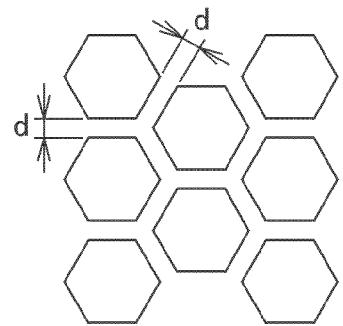

In FIG. 4, FIG. 4(A) is a plan view of a domain structure having a round shape in a planar view, FIG. 4(B) is one having a regular octagonal shape in a planar view, FIG. 4(C) is one having a square shape in a planar view, and FIG. 4(D) is one having a regular hexagonal shape in a planar view. As shown in FIGS. 4(C) and 4(D), when the planar-view shape of the domain structure is a square or a regular hexagon, each domain structure can be arranged such that every spacing width between each domain structure is equivalent c or d. At this time, bringing c or d closer to 0 can bring an area proportion of all the domain structures in the collector surface closer to 100%. This also applies to the case of the planar-view shape of the domain structure being a rectangle. As thus described, when the planar-view shape of the domain structure is a rectangle, a square or a regular hexagon, it is possible to freely design the area proportion of the domain structures in the collector surface while ensuring a necessary spacing width, so as to design an electrode with a large electrical capacitance.

As opposed to this, as shown in FIG. 4(A), when the planar-view shape of the domain structure is a round shape, different widths a1 and a2 certainly exist as spacing widths between each domain structure, and even when either of these is brought closer to 0, the other cannot be brought closer to 0. Hence there certainly exists a dead space other than the required spacing width, and there exists an upper limit of the area proportion of all the domain structures in the collector surface. In fact, in the domain structure whose planar-view shape is a round shape, an area proportion of all the domain structures in the collector surface cannot be set to a numerical value exceeding 74%. Such a problem also occurs in the domain structure in which spacing widths b1 and b2 exist and whose planar-view shape is a regular octagon, and also occurs in a similar manner in a domain structure exhibiting a polygonal shape other than that in a planar view (except for a rectangle, a square and a regular hexagon).

Next, a lithium-ion secondary battery (not shown) formed by using the electrode 1 of the present embodiment will be described.

This lithium-ion secondary battery is configured by appropriately combining the already explained electrode 1, an electrolyte and an electrode with the opposite polarity to the electrode 1, and the other battery constituents such as a separator, a gasket, a collector, a sealing plate and a cell case, which will be described below. A shape of the lithium-ion secondary battery is a cylindrical shape, a hone shape, a coin shape or the like, and is not particularly limited. Further, the structures of the lithium-ion secondary battery to be produced basically include, but are not particularly limited to, a structure of a secondary battery formed such that a negative electrode is placed on a cell ground plate, an electrolyte and a separator are placed thereon, and a positive electrode is further placed so as to be opposed to the negative electrode, and those are then caulked along with a gasket and a sealing plate.

Solvent used for the electrolyte include organic solvents such as propylene carbonate, ethylene carbonate, diethyl carbonate, dimethyl carbonate, ethyl methyl carbonate, 1,2-dimethoxyethan, γ-butyrolactone, tetrahydrofuran, 2-methyltetrahydrofuran, sulfolane, and 1,3-dioxolan, which are used singly or in combination of two or more of them. In these solvents, the order of 0.5 to 2.0 M of an electrolyte such as $LiClO_4$, $LiPF_6$, $LiBF_4$ or $LiCF_3SO_3$ may be dissolved to give an electrolyte (solution).

As for the electrode with the opposite polarity to the electrode 1, the already described materials usable as the positive electrode or the negative electrode can be used. These materials may be used by being applied to the collector or by some other means. It is to be noted that the electrode 1 of the present embodiment may be used as either the positive electrode or the negative electrode of the lithium-ion secondary battery, or the electrode 1 of the present embodiment may be used as the positive electrode and the negative electrode.

For the separator that holds the electrolyte, a material generally excellent in liquid retention properties may be used. For example, a nonwoven fabric of a polyolefin resin, a porous film or the like may be used. These can exert functions thereof by being impregnated into the foregoing electrolyte.

Next, one embodiment of a method for manufacturing the electrode 1 of the present embodiment will be described with reference to the drawings. FIGS. 5(A) to 5(F) are perspective views sequentially showing one example of a production procedure in the electrode of the present embodiment. It is to be noted that FIGS. 5(A) to 5(F) are views displayed by focusing attention on one domain structure 2 out of the electrode 1 as an assembly of a plurality of domain structures 2 and enlarging it for the sake of facilitating understanding. Further, although one embodiment of the manufacturing method described hereinafter is a description of one in which the planar-view shape of the domain structure 2 is a regular hexagon, the planar-view shape in the electrode 1 of the present invention is not limited to this. Further, the same matter as in the description of the foregoing electrode 1 will be provided with the same numeral and its descriptions will be omitted.

The manufacturing method of the present embodiment is provided with a resist layer forming step, a patterning step, a template introducing step, a metal material embedding step, and a template removing step. Hereinafter, each of the steps will be described.

Resist Layer Forming Step

In the manufacturing method of the present embodiment, a mold which was produced using a resist composition is used in order to produce the domain structure 2 so as to have a desired shape. This step is a step of applying the resist composition to the surface of the collector 3 to form a resist layer 5, as shown in FIGS. 5(A) to 5(B).

The resist composition that is used may be a negative type or a positive type. The negative-type resist composition has properties of being inherently soluble in a developer, but becoming insoluble in the developer by being irradiated with active energy rays such as ultraviolet rays or electron rays. On the other hand, the positive-type resist composition has properties of being inherently insoluble in the developer, but becoming soluble in the developer by being irradiated with the active energy rays such as the ultraviolet rays or the electron rays.

The resist composition is not particularly limited, and a known one can be used. Such a resist composition is exemplified by: (1) a cationic polymerization type resist composition which contains a compound having an epoxy group and a cationic polymerization initiator; (2) a novolac type resist composition which contains a novolac resin and a photosensitizing agent; (3) a chemically amplified type resist composition which has an acid dissociative elimination group and contains a photo-acid-generating agent and a resin whose alkali solubility increases due to elimination of the elimination group by an action of an acid generated from the photo-acid-generating agent by exposure to light; and (4) a radical polymerization type resist composition which contains a monomer and/or a resin having an ethylenically unsaturated bond and a radical polymerization initiator. Among those exemplified above, (1) and (4) are negative-type resist compositions, and (2) and (3) are positive-type resist compositions.

As a method of applying the resist composition to the surface of the collector 3 to form the resist layer 5, a known method can be used without any particular limit. As described later, the resist layer 5 is formed with a guide hole 51 to serve as a mold for forming the domain structure 2. This guide hole 51 is required to be formed so as to have a depth large enough to form the domain structure 2 with a desired height. A thickness of the resist layer 5 is decided as appropriate in consideration of a required depth of the guide hole 51 since it will become the depth of the guide hole 51 in the future. The thickness of the resist layer 5 is exemplified by, but not particularly limited to, 18 to 50 μm.

Patterning Step

Next, the patterning step will be described. The patterning step is a step performed after the above resist layer forming step, and is a step shown in FIG. 5(C). In this step, the guide hole 51, having the same shape in a planar view as the domain structure 2 intended to be produced, is formed in the resist layer 5 formed in the above resist layer forming step. The guide hole 51 is formed as a through hole passing through the resist layer 5 to the surface of the collector 3.

In this step, first, the resist layer 5 formed in the above resist layer forming step is subjected to selective exposure to light via a mask having the same shape in a planar view as the domain structure 2 intended to be produced. Thereby, when the resist layer 5 is formed of the negative-type resist composition, a place that will not become the guide hole 51 in the future is cured and becomes insoluble in the developer, and a place that will become the guide hole 51 in the future remains soluble in the developer. Further, when the resist layer 5 is formed of a positive-type resist composition, a place that will become the guide hole 51 in the future becomes soluble in the developer, and a place that will not become the guide hole 51 in the future remains insoluble in the developer.

The resist layer 5 subjected to selective exposure to light is developed. The development can be performed using a known developer by a known method. Such a developer is, for example, exemplified by an alkaline aqueous solution. Further, the development method is exemplified by an immersion method, a spray method, and the like.

In the developed resist layer 5, the guide hole 51 is formed which has the same shape in a planar view as the domain structure 2 intended to be produced and passes through to the surface of the collector 3. The resist layer 5 formed with the guide hole 51 is subjected, as necessary, to after-curing which is irradiation with active energy rays such as ultraviolet rays, and post-baking which is an additional thermal treatment.

Template Introducing Step

Next, the template introducing step will be described. The template introducing step is a step performed after the above patterning step, and is a step shown in FIG. 5(D). In this step, polymer microparticles 6 of polystyrene, PMMA (polymethyl methacrylate) or the like are deposited on the surface of the collector 3 existing at the bottom of the guide hole 51 formed in the above patterning step. These polymer microparticles 6 are used to form the holes 21 in the domain structure 2. That is, after deposition of the polymer microparticles 6 in the present step, the metal material 22 as an electrode material is embedded in the guide holes 51 in the later-mentioned metal material embedding step, and further, the polymer microparticles 6 are removed in the later-mentioned template removing step, to form the holes 21. That is, the polymer microparticle 6 is a mold for forming the hole 21 in the domain structure 2.

A material for the polymer microparticles 6 is not particularly limited so long as being one removable by a solvent, thermal treatment, or the like in the later-mentioned template removing step, but is exemplified by polystyrene, PMMA and the like. The shape of the polymer microparticle 6 is preferably, but not particularly limited to, a spherical shape. By the polymer microparticle 6 having a spherical shape, the polymer microparticles 6 can be close-packed inside the guide hole 51, which is preferred.

Examples of a particle size of the microparticle 6 include 0.05 to 5 μm. The hole diameter of the hole 21 in the domain structure 2 can be adjusted by a particle size of the polymer microparticle 6 to be used.

As a method for depositing the polymer microparticle 6 inside the guide hole 51, electrocataphoresis can be used. In this case, the collector 3 exposed to the bottom of the guide hole 51 may be regarded as an electrode for electrocataphoresis, and this collector 3 and a counter electrode to the collector 3 may be impregnated in a liquid suspended with the polymer microparticle 6, and then applied with an electric field for depositing the polymer microparticle 6 on the surface of the collector 3. Further, there may also adopted a method for depositing the polymer microparticle 6 by supplying the liquid suspended with the polymer microparticle 6 to the inside of the guide hole 51 and subsequently drying a liquid contained in the supplied suspension, or a method for depositing the polymer microparticle 6 inside the guide hole 51 by centrifugation. A thickness of deposition of the polymer microparticle 6 inside the guide hole 51 may be decided as appropriate in consideration of the height of the domain structure 2 to be formed. Since the depth of the guide hole 51, namely the height of the resist layer 5, is normally decided in consideration of the height of the domain structure 2 to be produced, the thickness of the polymer microparticle 6 to be deposited may be made uniform to the depth of the guide hole 51, but not particularly limited.

It is to be noted that, when electrocataphoresis is used as a means for depositing the polymer microparticle 6 inside the guide hole 51, a liquid to be used in the electrocataphoresis is preferably added in advance with a compound that applies an electric charge to the surface of the polymer microparticle 6, such as an amidine compound or a sulfate compound.

After the polymer microparticle 6 is deposited inside the guide hole 51, it is preferably subjected to thermal treatment at the order of 80 to 120° C., thereby to fuse the polymer microparticles 6 with each other. Performing this thermal treatment allows the polymer microparticles 6 to be kept in a fixed state in the later-mentioned metal material embedding step. In the metal material embedding step, the polymer microparticles 6 keep being regularly arranged inside the guide hole 51, thereby to make the holes 21 in the ultimately obtained domain structure 2 also regularly arranged.
Metal material embedding step Next, the metal material embedding step will be described. The metal material embedding step is a step performed after the above template introducing step, and is a step shown in FIG. 5(E). In this step, the inside of the guide hole 51 where the polymer microparticle 6 is deposited is filled with the metal material 22 for forming a positive electrode or a negative electrode.

The metal material 22 with which the inside of the guide hole 51 is filled is selected as appropriate in accordance with which the domain structure 2 to be produced constitutes, the positive electrode or the negative electrode. Since the metal material for constituting the positive electrode and the metal material for constituting the negative electrode have already been described, descriptions thereof will be omitted here.

A method for filling the inside of the guide hole 51 with the metal material 22 is exemplified by: 1) a plating method in which a known plating solution is used to electrically deposit the metal material 22 on the surface of the collector plate 3; 2) an electrocataphoresis method in which the metal material 22 is deposited on the surface of the collector plate 3 by electrocataphoresis by use of a liquid suspended with microparticles of the metal material 22; and 3) an injection method in which a liquid suspended with microparticles of the metal material 22 is directly injected inside the guide hole 51 by capillary and then dried. These methods are selected as appropriate in accordance with the kind of the metal material 22 with which the inside of the guide hole 51 is filled.

The polymer microparticle 6 deposited inside the guide hole 51 in the foregoing template introducing step undergoes the metal material embedding step, to be embedded in the metal material 22. Hence, inside the guide hole 51, the metal material 22 does not exist in a place where the polymer microparticle 6 exists, and the metal material 22 exists only in a place where the polymer microparticle 6 does not exist.
Template Removing Step Next, the template removing step will be described. The template removing step is a step performed after the above metal material embedding step, and is a step shown in FIG. 5(F). In this step, the polymer microparticle 6 embedded in the metal material 22 is removed. Thereby, the place where the polymer microparticle 6 exists becomes a space, and the hole 21 is formed.

For removing the polymer microparticle 6, the domain structure 2 in the making may just be impregnated in a solvent capable of dissolving the polymer microparticle 6. Such a solvent is selected as appropriate in accordance with the kind of the polymer microparticle 6. Those include, as one example, toluene, acetone, ethyl acetate, limonene, methanol, ethanol, isopropyl alcohol, and acetonitrile. The time for impregnating the domain structure 6 in the making in the solvent may be decided as appropriate in accordance with a dissolved state of the polymer microparticle 6, but include the order of 24 hours as one example.

After the polymer microparticle 6 is dissolved, the domain structure 2 in the making is taken out of the solvent and rinsed by a solvent such as acetone, which is then dried in a vacuum, to complete the domain structure 2 constituting the electrode 1.

It is to be noted that as the method for removing the polymer microparticle 6 buried in the metal material 22, an ashing method may be used in which heating is performed at a high temperature.

By undergoing each of the above steps, the domain structure 2 is formed. It is to be noted that, although the manufacturing method was described in the above while attention was focused on one domain structure 2 for the sake of facilitating understanding, since the electrode 1 is the assembly of the plurality of domain structures 2, the plurality of domain structures 2 are actually formed on the surface of the collector 3. The plurality of domain structures 2 may be simultaneously formed on the surface of the collector 3, or one or a few each thereof may be sequentially formed on the surface of the collector 3 by repetition of each of the above steps. In the case of simultaneously forming the plurality of domain structures 2 on the surface of the collector 3, in the above pattern forming step, the resist layer 5 may be selected and exposed to light by use of a mask in which a plurality of figures each having the same shape as the planar-view shape of the domain structure 2 are formed via a predetermined spacing distance.

The domain structures 2 formed through these steps are in a state where peripheries thereof are surrounded by the resist layer 5. The domain structures 2 may be used as they are as the electrode, or may be used as the electrode after removal of the resist layer 5 existing on the peripheries thereof as necessary. Methods for removing the resist layer 5 existing on the peripheries of the domain structures 2 include a known method, such as an etching method, and an ashing method in which heating is performed at a high temperature to dissolve the resist layer 5. Upon removal of the resist layer 5, the domain structure 2 formed as the polygonal prism shape is exposed to the surface of the collector 3 as shown in FIG. 3.

Figure 5:
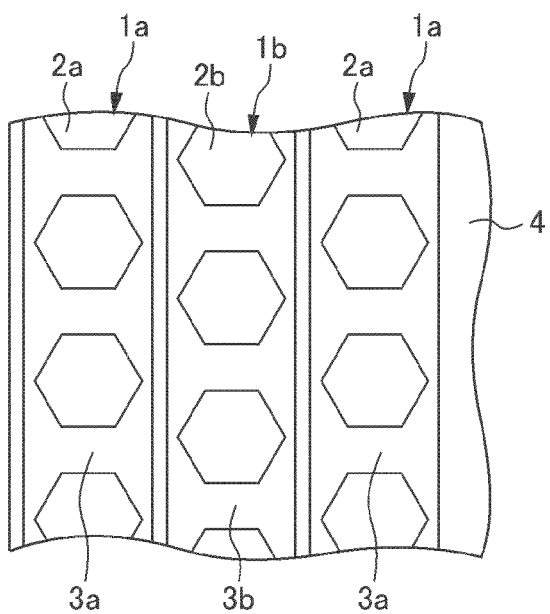
FIG. 5 is a plan view showing a second embodiment of the electrode of the present invention.
Figure 6A:
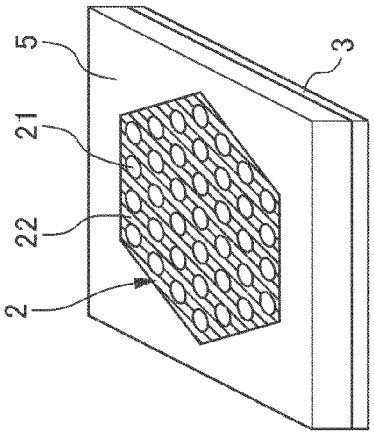
FIGS. 6(A) to 6(F) are perspective views sequentially showing one example of a production procedure in the electrode of the first embodiment of the present invention.
Figure 6B:
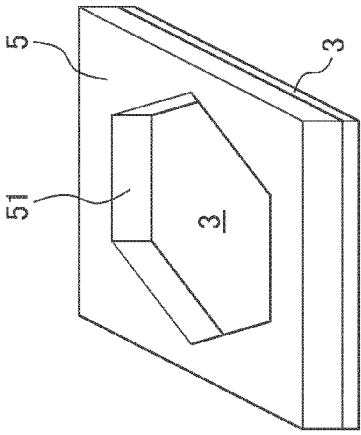
Figure 6C:
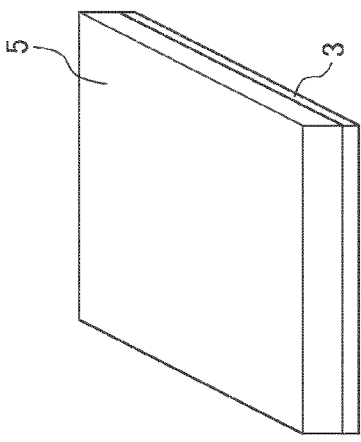
Figure 6D:
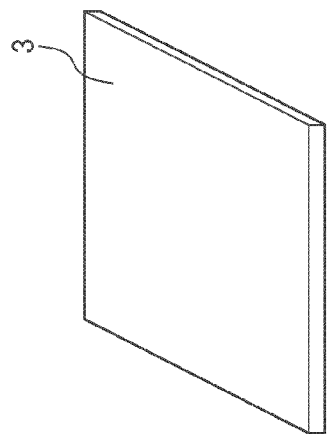
Figure 6E:
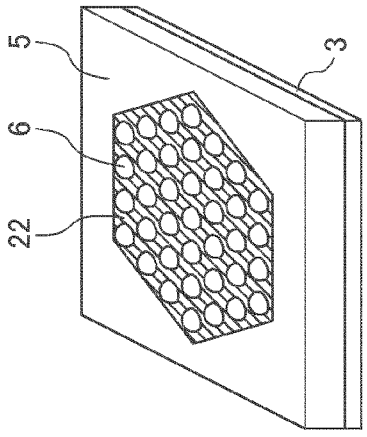
Figure 6F:
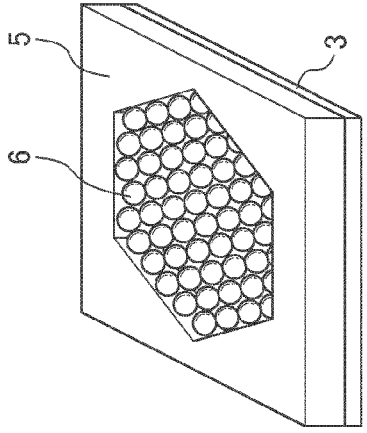

Next, a second embodiment of the present invention will be described with reference to the drawings. FIG. 5 is a plan view showing a second embodiment of the electrode of the present invention. The foregoing electrode 1 of the first embodiment was formed as the assembly of the domain structures 2 each having the same polarity on the surface of one collector 3. That is, the electrode 1 of the first embodiment is formed as the positive electrode or the negative electrode on the same plane. As opposed to this, in the second embodiment, a band-like positive collector 3a and negative collector 3b are alternately provided on the surface of one substrate 4, and an electrode 1a as a positive electrode is formed on the surface of the positive collector 3a while an electrode 1b as a negative electrode is formed on the surface of the negative collector 3b. That is, in the present embodiment, both the positive electrode 1a and the negative electrode 1b are alternately formed on the same plane. The number of times the positive electrode 1a and the negative electrode 1b are alternately repeated is one or more, and not particularly limited. Further, the number of positive electrodes 1a and the number of negative electrodes 1b formed on the surface of the substrate 4 do not necessarily need to be the same.

The positive electrode 1a is formed on the surface of the positive collector 3a as an assembly of aligned positive domain structures 2a. Further, a negative electrode 2b is formed on the surface of the negative collector 3b as an assembly of aligned negative domain structures 2b. Structures and formation methods of the positive domain structure 2a and the negative domain structure 2b are the same as those of the already described domain structure 2. In addition, although planar-view shapes of the positive domain structure 2a and the negative domain structure 2b are represented as regular hexagons in FIG. 5 for the sake of facilitating understanding, the planar-view shapes of the positive domain structure 2a and the negative domain structure 2b are not limited to the regular hexagon.

The positive collector 3a and the negative collector 3b each have a band-like shape, and alternately provided on the surface of the substrate 4. As for such positive collector 3a and negative collector 3b, the respective collectors 3a and 3b may be formed, for example, as comb-shaped metal foil opposed to each other, and these may be arranged so as to be interlocked to each other in the teeth portions of the respective comb shapes. In this case, the electrodes 3a and 3b are provided in the teeth portions of the comb shapes, and a positive current and a negative current are taken out of the top portions of the comb shapes. It is to be noted that the positive collector 3a and the negative collector 3b are arranged being apart from each other in order to avoid a short circuit of the battery. In addition, as a material constituting the positive collector 3a and the negative collector 3b, there can be used a similar one to that for the already described collector 3. Further, a method for forming the positive collector 3a and the negative collector 3b is exemplified by a method in which metal foil is laminated on the surface of the substrate 4 and the metal foil is processed into a desired shape by a known technique.

Shapes of the positive domain structure 2a and the negative domain structure 2b (hereinafter referred to as "domain structures 2a and 2b") in the present embodiment are not particularly limited, but those structures are preferably provided so as to each have a planar-view shape being a rectangle, a square or a regular hexagon. Reasons for that include what will be described below in addition to the one described in the foregoing first embodiment.

As already described, by each of the planar-view shapes of the domain structures 2a and 2b being a rectangle, a square or a regular hexagon, a spacing distance between each of the domain structures 2a and 2b can be made uniform. In the present embodiment, as described above, since the positive domain structure 2a and the negative domain structure 2b are alternately arranged in a vertical direction to a length direction of the collectors 3a and 3b (namely, a transverse direction in FIG. 5), when the spacing distance between each of the domain structures 2a and 2b is uniform, the positive domain structure 2a and the negative domain structure 2b are each arranged at a uniform distance therebetween. By the domain structures 2a and 2b arranged in such a manner, a battery is added with suitability for high-speed charge/discharge, which is preferred. In order to make the spacing distance between each of the domain structures 2a and 2b the same, it is preferable that the spacing distance between each of the collectors 3a and 3b be also the same.

Since the substrate 4 is provided with the positive collector 3a and the negative collector 3b on its surface, it desirably has the surface exhibiting insulating properties from the viewpoint of preventing these collectors from being short-circuited. Such a substrate 4 can be exemplified by, but is not particularly limited to, a silicon substrate having an oxide film on its surface.

Although not shown, as a modified example of the above second embodiment, the domain structures 2a and 2b may be arranged such that only the negative domain structures 2b exist around one positive domain structure 2a, and only the positive domain structures 2a exist around one negative domain structure 2b. That is, in the second embodiment, the polarities of the respective domain structures adjacent to each other in the transverse direction in FIG. 5 (vertical direction to the length direction of the collectors 3a and 3b) are opposite, whereas the polarities of the respective domain structures adjacent to each other in a longitudinal direction in FIG. 5 (length direction of the collectors 3a and 3b) are the same, but in this modified example, the polarities of the respective domain structures, which are adjacent to each other not only in the transverse direction but also in the longitudinal direction in FIG. 5, are opposite. In this case, the positive collector and the negative collector are arranged as appropriate so as not to be short-circuited to each other.

Although the specific descriptions were made in the above by citing the specific embodiments of the present invention, the present invention is not limited to the above embodiments, but can be changed as appropriate and then implemented in the range of the configuration of the present invention.

For example, although each of the respective domain structures 2, 2a, 2b has been a regular hexagon in a planar view in the above embodiments, it is not limited thereto, but may be a polygonal shape without an acute angle in a planar view.

Further, although each of the electrodes 1, 1a, 1b has been the electrode for a lithium-ion secondary battery in the above embodiments, it is not limited thereto, but may preferably be used in a secondary battery accompanied with swelling or shrinkage of the electrode during charge/discharge. Such secondary batteries include general secondary batteries such as a lead-acid battery, a nickel-cadmium battery and a nickel-hydrogen battery, other than the secondary battery accompanied with a release of metal ions from the material constituting the electrode or storage of a metal into the material constituting the electrode.

EXAMPLES

Although the present invention will be described below in a more specific manner by showing examples, the present invention is not limited to none of the following examples.
Resist Composition 70 parts by mass of cresol-type novolac resin (m-cresol:p-cresol=6:4 (mass ratio), mass average molecular weight of 30000), 15 parts by mass of bis(naphthoquinone-1,2-diazido-5-sulfonate) of 1,4-bis(4-hydroxyphenyl isopropylidenyl) benzene as a photosensitizing agent, and 15 parts by mass (mass average molecular weight of 100000) of poly methyl vinyl ether as a plasticizer were added with propyleneglycol monomethylether acetate (PGMEA) as a solvent such that a solid-content concentration was 40 percent by mass, which was then mixed and dissolved, to prepare a resist composition. This resist composition is a novolac system and a positive type.

Example 1

As for a flexible substrate as Cu foil (thickness of 50 μm) and a hard substrate having a Cu film on its surface (substrate with a 5000-Å Cu sputtering film formed on the surface of a silicon wafer having a thickness of 750 μm), the above resist composition was applied to the surface provided with the Cu foil or the film, and the solvent contained in the resist composition was evaporated, to form a resist layer with a thickness of 20 μm. This resist layer was irradiated with ultraviolet rays (ghi-mixed rays, 3000 mJ/cm$^2$) through a photomask, which was then developed by an alkaline developer, and washed with pure water. This led to formation of a plurality of through holes (guide holes) in a honeycomb shape on the surface of the Cu foil or the film, the holes each being a regular hexagon with one side of 50 μm and passing through to the surface of the Cu foil or the film. It is to be noted that every spacing width between the adjacent through holes was set to 15 μm.

Next, a monodisperse spherical particle of polystyrene (diameter of 1 μm, hereinafter referred to as "polystyrene particle") was dispersed in 2-propanol (80 mL) with a concentration of 0.43% by mass to prepare a suspension, and in this suspension, with the Cu foil or the film, part of which was exposed due to the through holes, regarded as a working electrode (negative electrode), a Ni plate (3×4 cm, thickness of 0.3 mm) regarded as a counter electrode (positive electrode) and a distance between the electrodes set to 1 cm, a voltage of 600 V was applied to perform electrocataphoresis for one minute. By this operation, the polystyrene particle was deposited in each of the plurality of through holes. Subsequently, each substrate was heated at a temperature of 110° C. for 15 minutes, thereby to thermally fuse the polystyrene particles to each other which were deposited in the through holes. NaOOCCH2CH2COONa.6H2O Next, distilled water was added with $NiCl_2.6H_2O$, $SnCl_2.2H_2O$, $K_2P_2O_7$ and $NH_2CH_2COOH$ so as to respectively have concentrations of 0.075 mol/L, 0.175 mol/L, 0.50 mol/L and 0.125 mol/L, and further, 28%-ammonia water was added such that a pH of this aqueous solution was 8.5. The obtained aqueous solution was used as a Sn—Ni plating bath, and with the Cu foil or the film, part of which was exposed due to the through holes, regarded as the working electrode (negative electrode) and a Sn plate regarded as the counter electrode (positive electrode), electrolytic plating processing was performed. The electrolytic plating processing was performed by applying a constant current of 1.75 mA for 1.5 hours.

The substrate having undergone the electrolytic plating processing was impregnated in toluene for 24 hours, and washed with acetone, thereby to remove the polystyrene particles deposited in the through holes, which was further dried in a vacuum. Through these procedural steps, the electrode having a plurality of domain structures made up of the porous Sn—Ni alloy was formed with respect to each of the flexible substrate and the hard substrate. This electrode was regarded as an electrode of Example 1. It is to be noted that a thickness of the formed electrode was 10 μm in either case of the flexible substrate or the hard substrate.

Example 2

An electrode of Example 2 was formed in a similar procedure to that of Example 1 except that the shape of the through hole formed in the resist layer was a square with one side of 50 μm, the through holes were arranged in a tiled form which was a linear line not blocking every joint, with every spacing width between the adjacent through holes being set to 15 μm, and current-application time for electrolytic plating processing was set to one hour. It is to be noted that the domain structure in the electrode of the present example was an arrangement as shown in FIG. 4(C) in a planar view. Further, a thickness of the formed electrode was 20 μm in either case of the flexible substrate or the hard substrate.

Comparative Example 1

An electrode of Comparative Example 1 was formed in a similar procedure to that of Example 1 except that the shape of the through hole formed in the resist layer was a circle with a diameter of 18 μm, the through holes were arranged in a staggered form with every spacing width between the adjacent through holes in the transverse direction and the longitudinal direction being set to 17 μm, a constant current in electrolytic plating processing was set to 1.37 mA, and current-application time was 0.9 hour. It is to be noted that a thickness of the formed electrode was 20 μm in either case of the flexible substrate or the hard substrate.

As results of measurement of a mass of the electrode per unit area in the electrode formation section in each of the electrodes of Examples 1 and 2 and Comparative Example 1, the mass of the electrode of Example 1 was from 4.5 to 5.0 mg/cm², that of the electrode of Example 2 was from 4.0 to 4.5 mg/cm², and that of the electrode of Comparative Example 1 was from 2.2 to 2.6 mg/cm². It is found therefrom that the electrode of the present invention has a larger mass and holds more electrode materials than that of the electrode having a domain structure in a round shape in a planar view.

Figure 7:
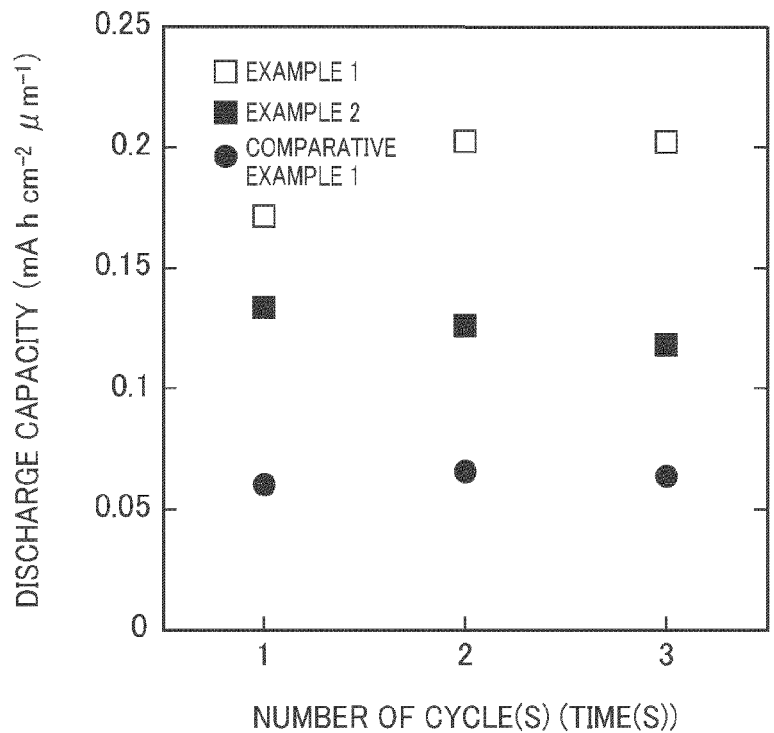
FIG. 7 is a plot showing a discharge capacity with respect to the number of cycles in each of electrodes of Examples 1 and 2 and Comparative Example 1 which were provided on a flexible substrate.
Figure 8:
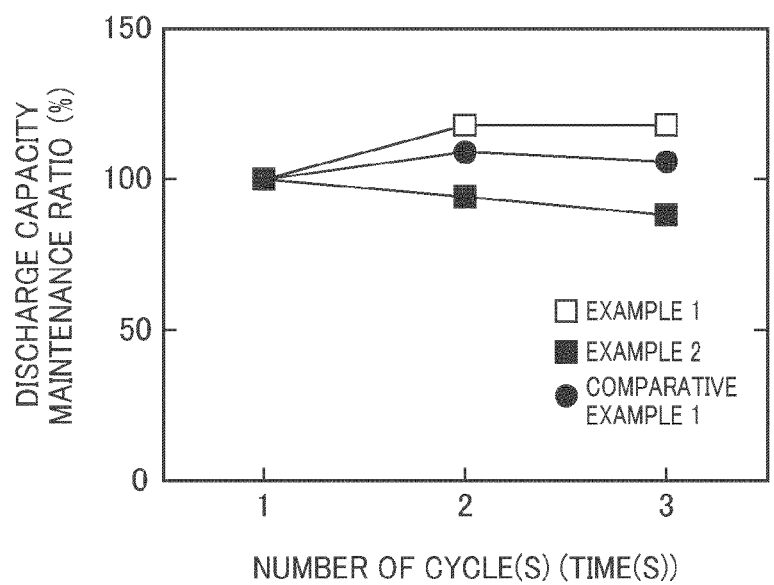
FIG. 8 is a plot showing a capacity maintenance ratio with respect to the number of cycles in each of electrodes of Examples 1 and 2 and Comparative Example 1 which were provided on the flexible substrate.

Each of the electrodes of Examples 1 and 2 and Comparative Example 1 provided on the flexible substrate was made opposed to metallic lithium via a separator, and a space between the electrode and metallic lithium was filled with an electrolyte (mixed solution of ethylene carbonate:diethyl carbonate=1:1 (v/v) dissolved with 1 mol/L of $LiClO_4$), to produce an electrochemical measurement cell. In this case, metallic lithium became a counter electrode and a reference electrode, and negative characteristics of the electrode of Example 1 or 2 or Comparative Example 1 as the working electrode are evaluated. In each of the produced electrochemical measurement cells, a discharge capacity at the time of repeating 1 to 4 cycles of charge/discharge was measured based on two-electrode electrochemical measurement. It is to be noted that for measurement of the discharge characteristics, HSV-100-type measuring device manufactured by HOKUTO DENKO CORP. was used, a potential range was set to 0 to 2.5 V, a constant current charge was performed with a current density of 0.1 $mAcm^{-2}$ until 0 V was reached, and thereafter a constant-potential charge was performed at 0 V until the current density became 0.01 $mAcm^{-2}$ or less. Then, constant current discharge was performed with a current density of 0.1 $mAcm^{-2}$ until 2.5 V was reached. The obtained discharge capacity was divided by a thickness of the electrode, and a result of calculation of the discharge capacity per unit thickness is shown in Table 1. Further, FIG. 7 shows a plot showing a discharge capacity with respect to the number of cycles in each of the electrodes of Examples 1 and 2 and Comparative Example 1 which were provided on the flexible substrate. Moreover, FIG. 8 shows a plot showing a discharge capacity maintenance ratio (%) with respect to the number of cycles in the case of the discharge capacity maintenance ratio at a first cycle being 100% in each of the electrodes of Examples 1 and 2 and Comparative Example 1 which were provided on the flexible substrate.

TABLE 1

| | Discharge capacity ($mAhcm^{-2} \mu m^{-1}$) | | |
| --- | --- | --- | --- |
| | Example 1 | Example 2 | Comparative Example 1 |
| First cycle | 0.171 | 0.134 | 0.060 |
| Second cycle | 0.202 | 0.126 | 0.066 |
| Third cycle | 0.202 | 0.118 | 0.064 |

As shown in Table 1, it is understood that the electrodes of Examples 1 and 2 each show a larger discharge capacity than that of the electrode of Comparative Example 1. The effectiveness of the present invention is understood therefrom.

Further, as shown in FIG. 8, it is understood that a decrease in discharge capacity at the time of repeating charge/discharge in the electrode of Example 1 is smaller than in the electrode of Example 2 among the electrodes of the present invention. It is understood therefrom that in the viewpoint of obtaining excellent charge/discharge cycle characteristics, the planar-view shape of the domain structure constituting the electrode is preferably a regular hexagon.

Figure 9:
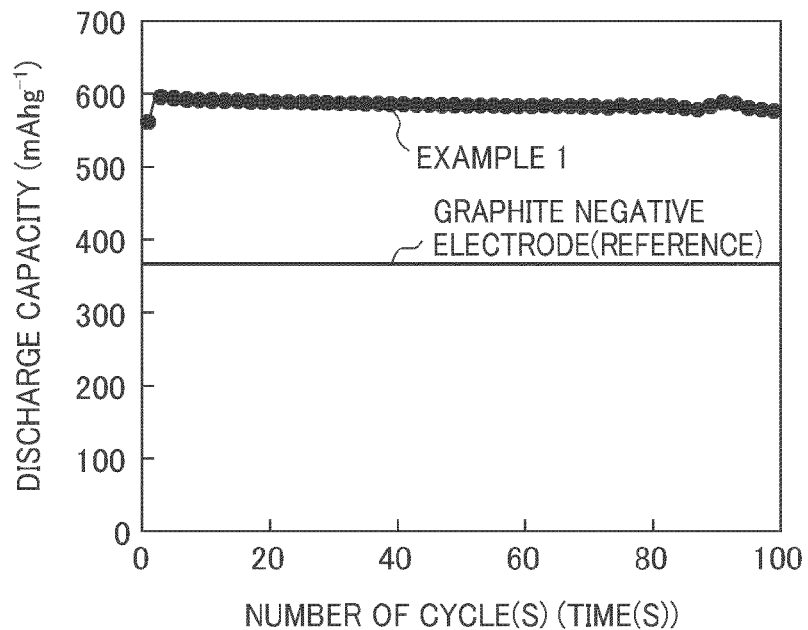
FIG. 9 is a plot showing transition of a discharge capacity with respect to the number of cycles in a negative electrode of Example 1.

As for the electrode of Example 1 preferred in the viewpoint of obtaining excellent charge/discharge cycle characteristics, a discharge capacity at the time of repeating 1 to 100 cycles of charge/discharge was measured based on two-electrode electrochemical measurement. First, the electrode of Example 1 was made opposed to metallic lithium via a separator, and a space between the electrode and metallic lithium was filled with an electrolyte (mixed solution of ethylene carbonate:diethyl carbonate=1:1 (v/v) dissolved with 1 mol/L of $LiClO_4$), to produce an electrochemical measurement cell. In this case, metallic lithium became a counter electrode and a reference electrode, and negative characteristics of the electrode of Example 1 as the working electrode were evaluated. In the produced electrochemical measurement cell, a discharge capacity at the time of repeating charge/discharge 1 to 100 cycles was measured based on two-electrode electrochemical measurement. It is to be noted that for measurement of the discharge characteristics, HSV-100-type measuring device manufactured by HOKUTO DENKO CORP. was used, a potential range was set to 0 to 2.5 V, a constant current charge was performed with a current density of 0.1 $mAcm^{-2}$ until 0 V was reached, and thereafter a constant-potential charge was performed at 0 V until the current density became 0.01 $mAcm^{-2}$ or less. Then, constant current discharge was performed with a current density of 0.1 $mAcm^{-2}$ until 2.5 V was reached. As for a result of this cycle test, FIG. 9 shows a plot showing transition of a discharge capacity with respect to the number of cycles. Further, FIG. 9 shows as a reference a discharge capacity (360 $mAhg^{-1}$) in the case of a general graphite electrode being a negative electrode.

As shown in FIG. 9, it is found that the electrode of Example 1 still maintains a high discharge capacity even when the charge/discharge cycle reaches 100 cycles. It is found therefrom that applying the present invention can significantly improve a life of an alloy-system negative electrode which has a high capacity, but whose long life has hitherto been difficult to accomplish.

Next, using the electrode of Example 1 as the negative electrode, a lithium-ion secondary battery in combination of this negative electrode with $LiNi_{0.8}Co_{0.15}Al_{0.05}O_2$ to become the positive electrode of the lithium-ion secondary battery was produced. First, the electrode of Example 1 was cut into a size of 28×68 mm, to produce the negative electrode. Next, there were mixed $LiNi_{0.8}Co_{0.15}Al_{0.05}O_2$ at a ratio of 94% by mass as a positive electrode active material, conductive carbon (acetylene black) at a ratio of 3% by mass as a conducting agent, and polyvinylidene fluoride at a ratio of 3% by mass as a binder, which was added with a solvent of N-methyl-2-pyrolidone, and this mixture was applied to the surface of aluminum foil (thickness of 16 μm) as a collector, and then dried and heat-treated, to produce a positive electrode. The produced positive electrode and negative electrode were adjusted so as to have almost the same electrical capacitance (30 mAh).

Then, after these positive/negative electrodes were laminated via a separator of a polyolefin microporous film, these electrodes were spirally wound to produce a power generating element, and after this was housed into a laminate film case, an electrolyte (mixed solution of ethylene carbonate:dimethyl carbonate=3:7 (v/v) dissolved with 1 mol/L of $LiPF_6$) was poured thereinto and sealed by lamination processing, to produce a lithium-ion secondary battery (50×90 mm). It should be noted that lamination processing was implemented using an industrial laptop seal-package device (product name: SQ-303, manufactured by SHARP CORPORATION, and sold by ASAHI KASEI PAX CORPORATION), in settings of a temperature of a joint section to about 180° C., intake performance to 66.7 kPa, and intake time to 10 seconds.

Figure 10:
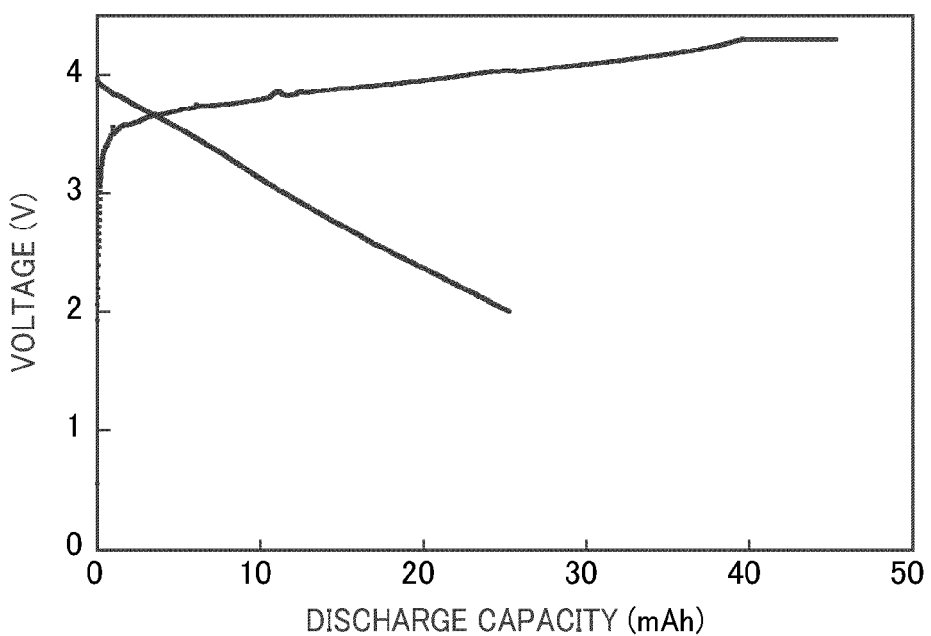
FIG. 10 is a plot showing charge/discharge characteristics in a lithium-ion secondary battery, to which the negative electrode of Example 1 has been applied.

Using the produced lithium-ion secondary battery, charge and discharge were each performed once at a room temperature (25° C.). FIG. 10 shows a plot of charge/discharge characteristics observed at that time. It is to be noted that the charging conditions were set such that a potential range was set to 2 to 4.3 V, a constant current charge was performed with a current density of 4 $mAcm^2$ until 4.3 V was reached, and thereafter, a constant-potential charge was performed at 4.3 V until the current density became 0.5 $mAcm^{-2}$ or less. Then, constant current discharge was performed with a current density of 4 $mAcm^{-2}$ until 2 V was reached.

As shown in FIG. 10, it was understood that the produced lithium-ion secondary battery was provided with charge/discharge characteristics, and shown that the electrode of the present invention was useful for production of the secondary battery.

The invention claimed is:

1. An electrode formed on the surface of a collector as an assembly of a plurality of porous domain structures which are spaced apart from each other,
    wherein each of the porous domain structures each have has a polygonal shape without an acute angle in a planar view, the polygonal shape having a maximum diameter of 120 μm or less, and
    each of the porous domain structures each have has a plurality of holes formed therethrough.

2. The electrode according to claim 1, wherein a shape of the domain structure is a rectangle, a square or a regular hexagon in a planar view.

3. The electrode according to claim 1, wherein the domain structures are arranged such that a spacing width between each domain structure is constant.

4. The electrode according to claim 1, wherein said electrode is used in a secondary battery.

5. The electrode according to claim 4, wherein the secondary battery is a lithium-ion secondary battery.

6. A lithium-ion secondary battery which is formed by using the electrode according to claim 5.

* * * * *

UNITED STATES PATENT AND TRADEMARK OFFICE
CERTIFICATE OF CORRECTION

| | |
|---|---|
| PATENT NO. | : 9,196,897 B2 |
| APPLICATION NO. | : 13/811347 |
| DATED | : November 24, 2015 |
| INVENTOR(S) | : Asai et al. |

Page 1 of 1

It is certified that error appears in the above-identified patent and that said Letters Patent is hereby corrected as shown below:

In the specification
Col. 4, line 18, delete "$V_2O_5m$" insert --$V_2O_5$,--.
Col. 8, line 12, delete "dimethoxyethan," insert --dimethoxyethane,--.
Col. 15, line 10, delete "$6H_2O$" insert --$6H_2O$.--.
Col. 15, line 11, delete "distillated" insert --distilled--.
Col. 17, line 47, delete "pyrolidone," insert --pyrrolidone,--.
Col. 18, line 20, delete "4 $mAcm^2$" insert --4 $mAcm^{-2}$--.
In the claims
Col. 18, line 36 (Claim 1), after "structures" delete "each have".
Col. 18, line 40 (Claim 1), after "structures" delete "each have".

Signed and Sealed this
Twenty-sixth Day of July, 2016

Michelle K. Lee
*Director of the United States Patent and Trademark Office*